Sept. 7, 1965  C. W. AHRENS  3,204,953
ROCKING ANIMAL STRUCTURE
Filed June 18, 1962  2 Sheets-Sheet 1
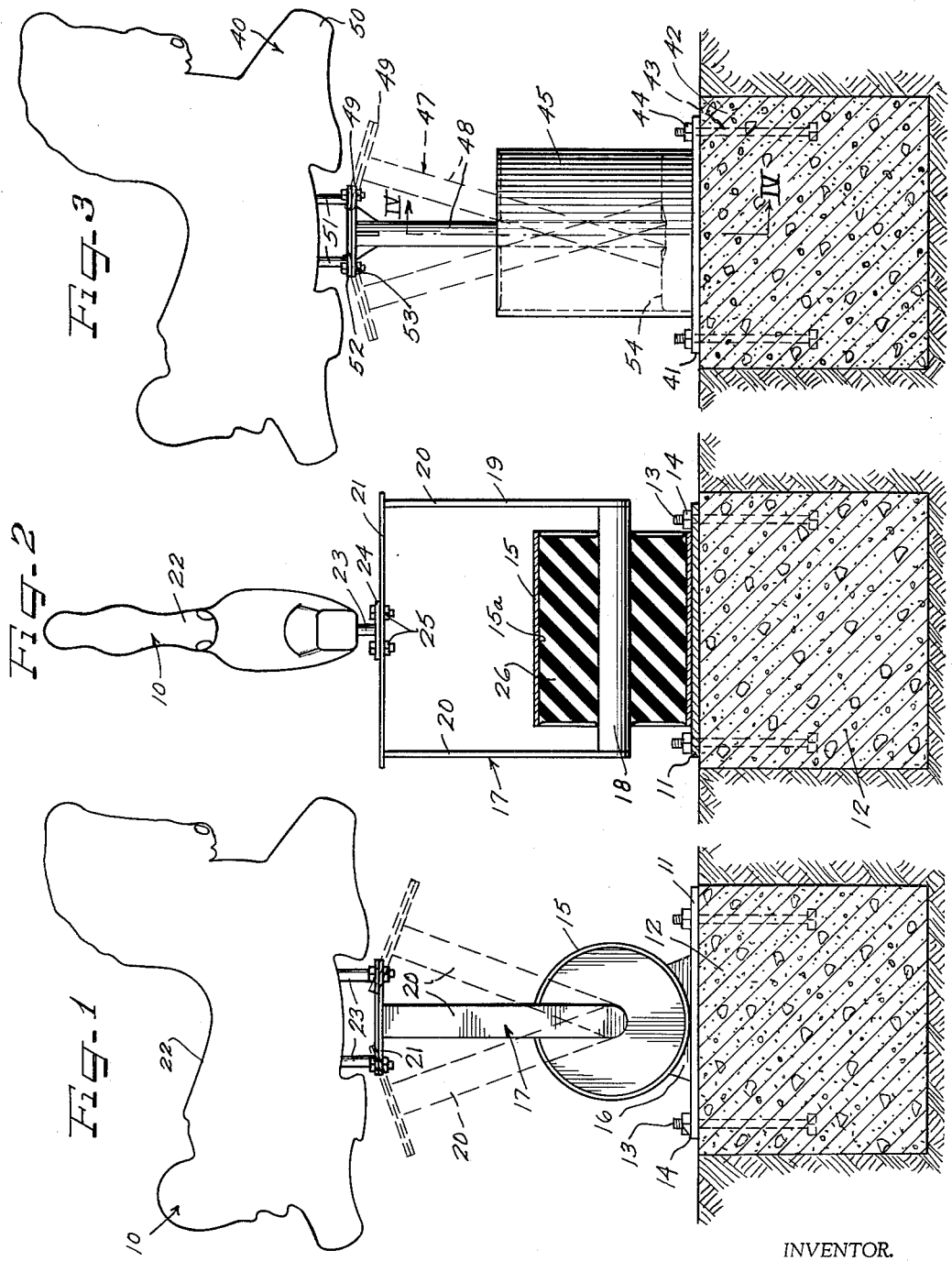
INVENTOR.
Claude W. Ahrens
BY Rudolph L. Lowell
ATTORNEYS Sept. 7, 1965  C. W. AHRENS  3,204,953
ROCKING ANIMAL STRUCTURE
Filed June 18, 1962  2 Sheets-Sheet 2
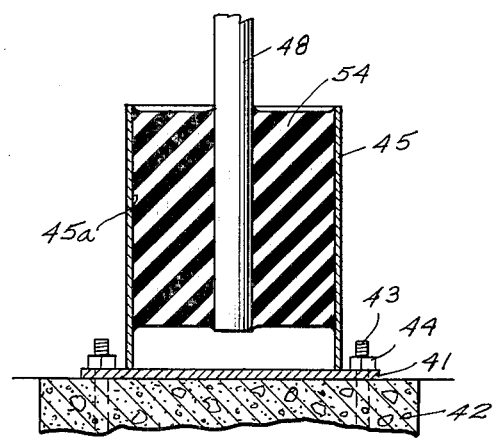
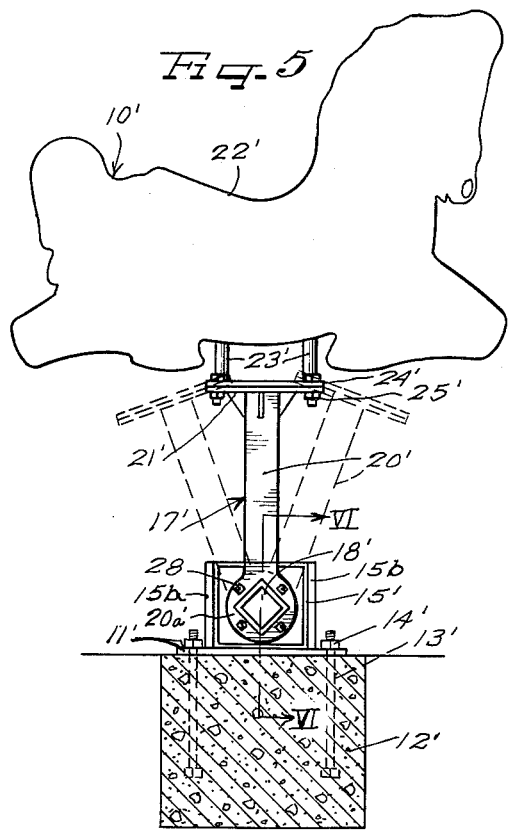
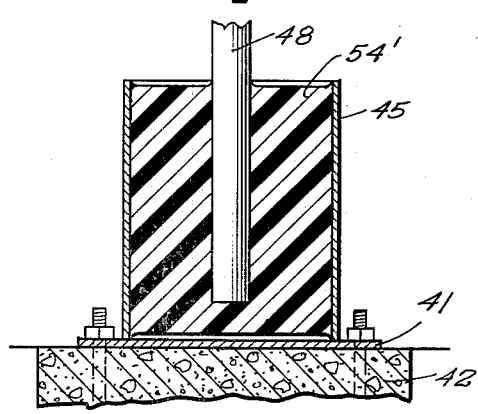
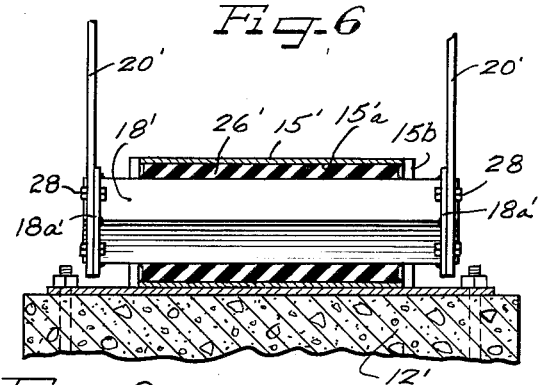
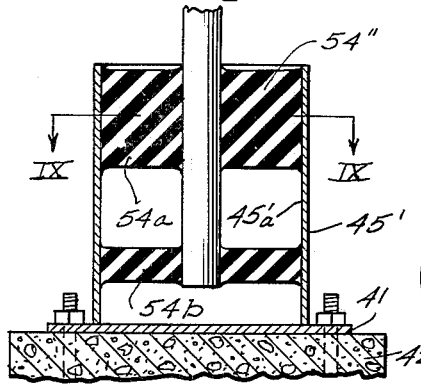
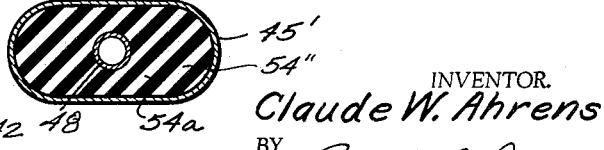
INVENTOR.
Claude W. Ahrens
BY
Rudolph L. Lowell
ATTORNEYS

3,204,953
ROCKING ANIMAL STRUCTURE
Claude W. Ahrens, Box 275, Grinnell, Iowa
Filed June 18, 1962, Ser. No. 203,163
3 Claims. (Cl. 272—52)

The present invention relates generally to a rocking animal on which children can ride for entertainment and healthful exercise. More particularly, the present invention relates to various different types of simplified means for mounting and for rocking the animal.

In the past, a number of different techniques have been employed for mounting and rocking animals or horses including various types of springs for spring mounted horses, electric motors for motor driven rocking horses and the like. The present invention concerns itself with the utilization of various types of elastomers such as rubber or synthetic plastic or rubber material to provide the means for rocking the animal back and forth. To this end, a rubber or synthetic material such as plastic or synthetic rubber is bonded with an interior wall area of a housing and with an exterior surface area of a post member carrying the animal. When the animal is moved in a forward direction, the rubber or synthetic material is forcefully displaced and when the momentum of the forward movement of the animal is exhausted, the displaced rubber or synthetic material will cause the animal to be rocked in an opposite rearward direction whereupon the rubber or synthetic plastic or rubber material is again forcefully displaced and will cause the animal to be moved in a forward direction again. According to other features, the elastomeric material also provides means for mounting the horse on a housing.

The animal, which is the subject of the present invention, is particularly well suited for installation at playgrounds and recreational areas such as municipal parks and school yards.

An important object of this invention is to provide a new and improved rocking animal.

Still another important object of this invention is to provide a new and improved means for mounting a rocking animal.

Yet another object of this invention is to provide a new and improved rocking animal which may be economically manufactured and installed at a minimum of expense.

A still further object of this invention is to provide a new and improved rocking animal which has a long life and which can be maintained at a minimum of expense.

According to important features of the present invention, there is provided a rocking animal on which children can ride which comprises a base, a housing mounted on a base, first means for rocking back and forth with respect to the housing having an animal mounted thereon, and elastomeric material disposed within the housing bonded in assembly with said housing as well as in assembly with said first means and with the elastomeric material providing means for causing the animal to rock back and forth as the first means are moved.

Other objects and features of the present invention will more fully become apparent in view of the following detailed description taken in conjunction with the accompanying drawings illustrating therein several embodiments and in which:

FIGURE 1 is a side view of a rocking horse illustrated in full and dotted lines;

FIGURE 2 is an end view partially in section and partially in elevation showing the rocking horse of FIGURE 1 in further detail;

FIGURE 3 is a side elevation of a modified form of a rocking horse illustrated in full and dotted lines;

FIGURE 4 is a vertical section taken substantially on the line IV—IV looking in the direction indicated by the arrows as shown in FIGURE 3 and with a horse support post shown in elevation;

FIGURE 5 is a side elevation of still another type of rocking horse shown in full and dotted lines;

FIGURE 6 is an enlarged cross sectional view with portions shown in elevation which section is taken substantially on the line VI—VI looking in the direction indicated by the arrows as shown in FIGURE 5;

FIGURE 7 is a vertical section similar to FIGURE 4 only illustrating still another modified form;

FIGURE 8 is a vertical section similar to FIGURE 7 only illustrating yet another modified form; and FIGURE 9 is a transverse section taken substantially on the line IX—IX looking in the direction indicated by the arrows as shown in FIGURE 8.

As shown on the drawings:

The reference numeral 10 indicates generally a rocking animal or preferably a rocking horse. The horse 10 includes a base 11 mounted on a concrete foundation 12 and secured to the foundation by means of bolts 13 embedded in the concrete foundation and extended through holes in the base 11. Nuts 14 are secured on the bolts 13 for clamping the base 11 to the foundation 12. A housing 15 is secured in assembly with reinforcing legs 16 by suitable means such as welds and the housing 15 as well as the legs 16 are secured to the base 11 by suitable welds, also.

A first means 17 is secured in assembly with the housing 15 and includes a rock shaft 18 as well as an animal horse supporting frame 19. The frame 19 includes a pair of end posts 20 which are in welded assembly with the rock shaft 18 as well as a connecting animal mounting bracket 21 which is in welded assembly with the end posts 20—20 at upper ends thereof.

An animal which is here illustrated as a rocking horse 22 is mounted on a pair of mounting pin members 23 which in turn are secured to a mounting pin plate 24. The plate 24 is secured with the connecting animal mounting bracket 21 by means of a series of fasteners 25. Disposed inside of the housing is an elastomeric material 26 here illustrated as comprising a rubber type material. The elastomeric material 26 is in bonded assembly with the exterior of the rock shaft 18 as well as an interior housing wall 15a. In this form of the invention, the housing 15 is illustrated as comprising a cylinder and the housing wall 15a is cylindrical in shape as is the eleastomeric material 26 disposed therein.

A child may mount the horse 22 and by throwing his force forward will cause the rock shaft 18 to rotate and twist the elastomeric material 26. When the momentum of the forward push exerted by the child is exhausted, the twisted elastomeric material 26 will recoil and cause the horse 22 to rock rearwardly as shown in FIGURE 1. The forward and rearward rocking positions are shown in dotted lines in FIGURE 1. In this form of my invention, the elastomeric material totally fills the cavity defined by the housing 15 except for the area occupied by the rock shaft 18.

In FIGURES 5 and 6 are shown a modified type of rocking animal indicated generally at 10'. Primed reference numerals have been employed here to designate parts which are identical or substantially identical to the parts previously described in connection with the description of the animal 10 shown in FIGURES 1 and 2. In this instance, the horse 10' includes a base 11' mounted on a concrete foundation 12'. The base 11' is secured to the concrete foundation 12' by means of bolts 13' and nuts 14' in the same manner previously discussed.

A rectangularly shaped housing 15' is secured in any suitable way between a pair of housing mounting plates 15a, 15b preferably by welding the plates 15a, 15b in assembly with the base 11'. A first means is mounted on the housing 15' and includes a rock shaft 18' as well as end posts 20', 20' and a connecting animal mounting bracket 21' which secures the posts 20', 20' together at the upper ends thereof. The posts 20' each have an enlarged end 20a' provided with a square-shaped opening and an end of the rock shaft 18' is lodged therein.

The rock shaft 18' has a pair of rock shaft mounting brackets 18a' at opposite ends thereof and fasteners 28 are extended therethrough and through the enlarged ends 20a' of the end posts 20', 20' for securing the rock shaft 18' in assembly with the end posts 20', 20'.

Disposed within the housing 15' is an elastomeric material 26' which elastomeric material is suitably bonded in assembly with an interior square-shaped wall 15a' of the housing 15' as well as in assembly with an exterior square-shaped surface of the rock shaft 18'. The rock shaft 18' can be of any suitable configuration and may have four, five, six, or more corners, as desired. These corners are well suited for gripping engagement with the elastomeric material 26'.

In FIGURES 3 and 4 is shown still another form of my rocking animal or horse indicated generally at 40. In this instance, the rocking animal 40 includes a base 41 overlying a concrete foundation 42 which is secured in assembly therewith by means of bolts 43 and nuts 44, in the same manner as previously described. Suitably secured such as by means of welds with the base 41 is a cylindrical metal housing 45.

A first means 47 comprising a vertical pivot shaft 48 is mounted within the housing 45 as will hereafter be described in further detail. A connecting animal mounting bracket 49 is secured at an upper end of the shaft 48 in assembly therewith by welds or the like. An animal or rocking horse 50 overlies the vertical shaft 48 and is provided with a pair of mounting pin members 51 which are each secured at one end with the animal 50 and at an opposite end with a mounting pin plate 52. In order to secure the bracket 49 with the plate 52, a series of fasteners 53 such as bolt and nut fasteners are utilized.

Within the cylindrical housing 45 there is provided an elastomeric material or elastomer indicated generally at 54. This material is bonded with an interior surface 45a of the housing 45 as well as with an exterior surface of the vertical shaft 48. When a child mounts the horse 50 and urges the hourse 50 in a forward direction, the elastomeric material is displaced and when the momentum of the force exerted is exhausted, the displaced elastomeric material will exert a spring back force against the vertical shaft 48 to cause the vertical shaft or post member to rock rearwardly in an opposite direction.

In the form shown in FIGURES 3 and 4, it will be noted that the elastomeric material does not fully occupy the space defined by the housing 45 and that the bottom area of the housing 45 is free of the elastomeric material. The bond between the elastomeric material and the vertical post member 48 is sufficient to maintain the post member 48 as well as the animal 50 in spaced relation off of the bottom of the housing and free of the base 41. This relationship is in contrast to the relationship of the elastomeric material 54' shown in the housing 45 in FIGURE 7 wherein the elastomeric material 54' fills the cavity defined by the housing 45 and where the elastomeric material is disposed between the end of the vertical shaft 48 and the base 41 to support the shaft 48 on the base 41. By virtue of the spaced relation of the material 54 in FIGURE 4 with the base 41, the material 54 is more displaced axially of the post 48 so as to provide for an up and down movement of the animal 50, concurrently with a back and fourth rocking movement thereof.

The elastomeric material may be comprised of any suitable type such as natural rubber, synthetic rubber, synthetic plastic and the like. The term "elastomer" or "elastomeric material," as used in the specification and claims, is intended to be generic to all forms of these materials. FIGURES 1–4 show that the elestomeric material comprises rubber while FIGURE 7 illustrates the elastomeric material as comprising a synthetic plastic.

In FIGURE 8 the elastomeric material 54" is configurated or shaped in a different manner than previously described, and it will further be noted that the housing 45' is oval-shaped as is the elastomeric material 54". In this instance, the elastomeric material 54" comprises a pair of vertically spaced elastomeric rings 54a and 54b which are each in bonded assembly with the vertical post 48a and with the interior housing wall 45a' of the housing 45'.

Where plastic material is used, it will be appreciated that such material is more rigid and that the rocking action and up and own action can be controlled or restricted by using a synthetic plastic instead of a rubber material. The two actions can further be controlled by varying the volume of elastomeric material bonded with the housing and shaft, as shown in FIGURE 8. It will be appreciated that in all of the modifications disclosed the animal is subject to a sidewise tilting action which can take place concurrently with the back and forth rocking action, and the up and down vertical action so as to afford complete manipulation of the animal in all directions. Additionally these actions can be controlled by varying the type of elastomer employed, by varying the volume of the elastomer employed, and by varying the shape of the elastomer employed.

In summary, the elastomeric material 26, 26', 54 and 54" are all formed in the shape of rings while the elastomeric material 54' comprises a cup-shaped elastomeric article with the shaft 48 carried within the cup. While elastomeric rings and cups have been employed, it will be appreciated that the elastomeric material may be configurated in any suitable way so long as it can cooperate with the shaft or post member to provide the desired riding actions.

It will be understood that modifications and variations may be effected without departing from the scope of the novel concepts of the present invention.

I claim as my invention:

1. A rocking animal structure for children positionable on a base comprising:
   (a) housing means secured to said base, said housing means having a chamber with an open upper end defined by an upwardly extended side wall and a bottom wall,
   (b) elastomeric material disposed within said chamber, said material being spaced above said bottom wall and bonded to said side wall,
   (c) means including an animal on which a child can be seated, and
   (d) upright post means having an upper end secured in said animal and a bottom end positioned substantially along the longitudinal axis of said chamber and embedded within the elastomeric material, the bottom end being spaced from the bottom wall of said housing means whereby the animal may be manipulated to have a sidewise tilting action concurrently with a back and forth rocking action and an up and down vertical action.

2. The rocking animal structure of claim 1 wherein said elastomeric material includes:
 (a) a plurality of ring members disposed in a longitudinally spaced relation with respect to each other, each ring member being bonded to the side wall of said housing means and the bottom end of said post means.

3. The rocking animal structure of claim 1 wherein the housing means includes:
 (a) a side wall having an oval shape.

References Cited by the Examiner

UNITED STATES PATENTS

| | | | |
|---|---|---|---|
| 139,948 | 6/73 | Doremus | 248—375 |
| 2,051,043 | 8/36 | Herold | 248—374 |
| 2,115,458 | 4/38 | Geyer | 248—9 |
| 2,746,754 | 5/56 | Martel | 272—52 |
| 2,891,744 | 6/59 | Hirst et al. | 248—9 |

RICHARD C. PINKHAM, *Primary Examiner.*